United States Patent
Rauh et al.

(10) Patent No.: US 12,093,156 B2
(45) Date of Patent: Sep. 17, 2024

(54) CONNECTION POOL MANAGEMENT USING PREDICTED AUTHENTICATION DATA

(71) Applicant: International Business Machines Corporation, Armonk, NY (US)

(72) Inventors: Nathan Jon Rauh, Rochester, MN (US); Kyle Aure, Red Wing, MN (US); James Stephens, Palisade, MN (US); Mark Swatosh, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 17/450,919

(22) Filed: Oct. 14, 2021

(65) Prior Publication Data

US 2023/0120014 A1 Apr. 20, 2023

(51) Int. Cl.
*G06F 11/30* (2006.01)
*G06F 9/50* (2006.01)
*G06F 11/34* (2006.01)

(52) U.S. Cl.
CPC ........ *G06F 11/3051* (2013.01); *G06F 9/5077* (2013.01); *G06F 11/3409* (2013.01); *G06F 2209/5011* (2013.01)

(58) Field of Classification Search
CPC ............... G06F 11/3051; G06F 9/5077; G06F 11/3409; G06F 2209/5011
See application file for complete search history.

(56) References Cited

U.S. PATENT DOCUMENTS

| | | | |
|---|---|---|---|
| 5,553,239 A | 9/1996 | Heath et al. | |
| 6,105,067 A | 8/2000 | Batra | |
| 6,343,313 B1* | 1/2002 | Salesky | H04L 69/329 715/752 |
| 8,244,865 B2 | 8/2012 | Burke et al. | |
| 8,621,031 B2 | 12/2013 | Desai | |
| 8,788,640 B1* | 7/2014 | Masters | H04L 45/123 370/468 |

(Continued)

FOREIGN PATENT DOCUMENTS

| | | |
|---|---|---|
| CN | 102609467 A | 7/2012 |
| CN | 103605727 A | 2/2014 |

(Continued)

OTHER PUBLICATIONS

Mell et al., "The NIST Definition of Cloud Computing", Computer Security Division, National Institute of Standards and Technology, Jan. 2011, 7 pages.

*Primary Examiner* — Benjamin C Wu
(74) *Attorney, Agent, or Firm* — Yee & Associates, P.C.

(57) ABSTRACT

A computer implemented method manages connections. A number of processor units monitor connection requests to access a set of backend resources. The number of processor units identify request groups for the connection requests based on authentication data in the connection requests. The number of processor units analyze the connection requests to identify a usage trend for connections by the request groups. The number of processor units predict the usage trend of the connections for a period of time to form a predicted usage trend for connections in the period of time. The number of processor units manage a connection pool based on the predicted usage trend for the connections in the period of time.

17 Claims, 12 Drawing Sheets

(56) References Cited

U.S. PATENT DOCUMENTS

| | | | |
|---|---|---|---|
| 10,356,173 B2 | 7/2019 | Chang et al. | |
| 10,833,959 B2* | 11/2020 | Barghouthi | H04L 67/125 |
| 11,762,699 B2* | 9/2023 | Manchale Sridhar | G06F 16/217 718/104 |
| 2002/0065915 A1* | 5/2002 | Anderson | H04L 67/75 709/225 |
| 2005/0172029 A1* | 8/2005 | Burke | H04L 67/141 709/227 |
| 2012/0131093 A1* | 5/2012 | Hamano | G06F 9/5088 709/203 |
| 2012/0230345 A1* | 9/2012 | Ovsiannikov | H04L 47/22 370/412 |
| 2013/0304616 A1* | 11/2013 | Raleigh | H04M 15/43 705/34 |
| 2016/0065421 A1* | 3/2016 | Barghouthi | H04L 67/125 707/783 |
| 2016/0330286 A1* | 11/2016 | Keith | H04L 67/63 |
| 2019/0005047 A1* | 1/2019 | D'Amore | G06F 16/252 |
| 2019/0261225 A1* | 8/2019 | Eswarakava | H04W 76/27 |
| 2019/0364020 A1* | 11/2019 | Wardell | H04W 12/062 |
| 2020/0358713 A1* | 11/2020 | Jain | H04L 41/149 |
| 2021/0011797 A1* | 1/2021 | Robison | G06F 11/0793 |
| 2021/0014302 A1* | 1/2021 | Robison | H04L 67/141 |
| 2021/0081427 A1* | 3/2021 | Obembe | G06F 16/252 |
| 2021/0126964 A1* | 4/2021 | Obembe | G06F 11/3433 |
| 2021/0149879 A1* | 5/2021 | Kancharla | G06F 16/2379 |
| 2021/0182303 A1* | 6/2021 | Patel | H04L 43/04 |
| 2021/0204152 A1* | 7/2021 | Vasudevan | H04L 41/147 |
| 2022/0052968 A1* | 2/2022 | Catalano | H04L 47/83 |
| 2023/0071047 A1* | 3/2023 | Carames | G06F 9/5005 |
| 2023/0177035 A1* | 6/2023 | Wei | G06F 17/18 707/741 |
| 2023/0196182 A1* | 6/2023 | Zhang | G06F 16/27 706/12 |

FOREIGN PATENT DOCUMENTS

| | | |
|---|---|---|
| CN | 103617048 A | 3/2014 |
| CN | 112732441 A | 4/2021 |

\* cited by examiner

CONNECTION POOL MANAGEMENT USING PREDICTED AUTHENTICATION DATA

BACKGROUND

1. Field

The disclosure relates generally to an improved computer system and more specifically to managing connection a connection pool to backend resources in a computer system.

2. Description of the Related Art

Applications can access a backend resource such as a database or a messaging system. When an application accesses a backend resource such as a database, operations are performed that create, maintain, and release a connection to the database. These operations can place a strain on application resources as the number of users and requests increase.

For example, with a database, connections to the database can be costly for a database server to create and maintain. Applications on the Internet can connect and disconnect frequently with a database. Surges in requests to a database can increase the overhead for applications that causes performance to deteriorate. When a significant number of users are present and a sizable number of queries are made to the database, connection pooling can be used to increase performance. With connection pooling, large numbers of user requests do not incur the overhead of creating a new connection because an existing connection can be located and used from a connection pool. The overhead of disconnecting is also avoided because when a request is processed and a response is returned, the connection can be returned to the connection pool. As are result, after initial resources are used to create the connections in the connection pool, the overhead of the connections is reduced with the reuse of the connections.

SUMMARY

According to an illustrative embodiment, a computer implemented method manages connections. A number of processor units monitor connection requests to access a set of backend resources. The number of processor units identify request groups for the connection requests based on authentication data in the connection requests. The number of processor units analyze the connection requests to identify a usage trend for the connections by the request groups. The number of processor units predict the usage trend of the connections for a period of time to form a predicted usage trend for connections in the period of time. The number of processor units manage a connection pool based on the predicted usage trend for the connections in the period of time. According to other illustrative embodiments, a computer system and a computer program product for managing connections are provided.

DETAILED DESCRIPTION

Figure 1:
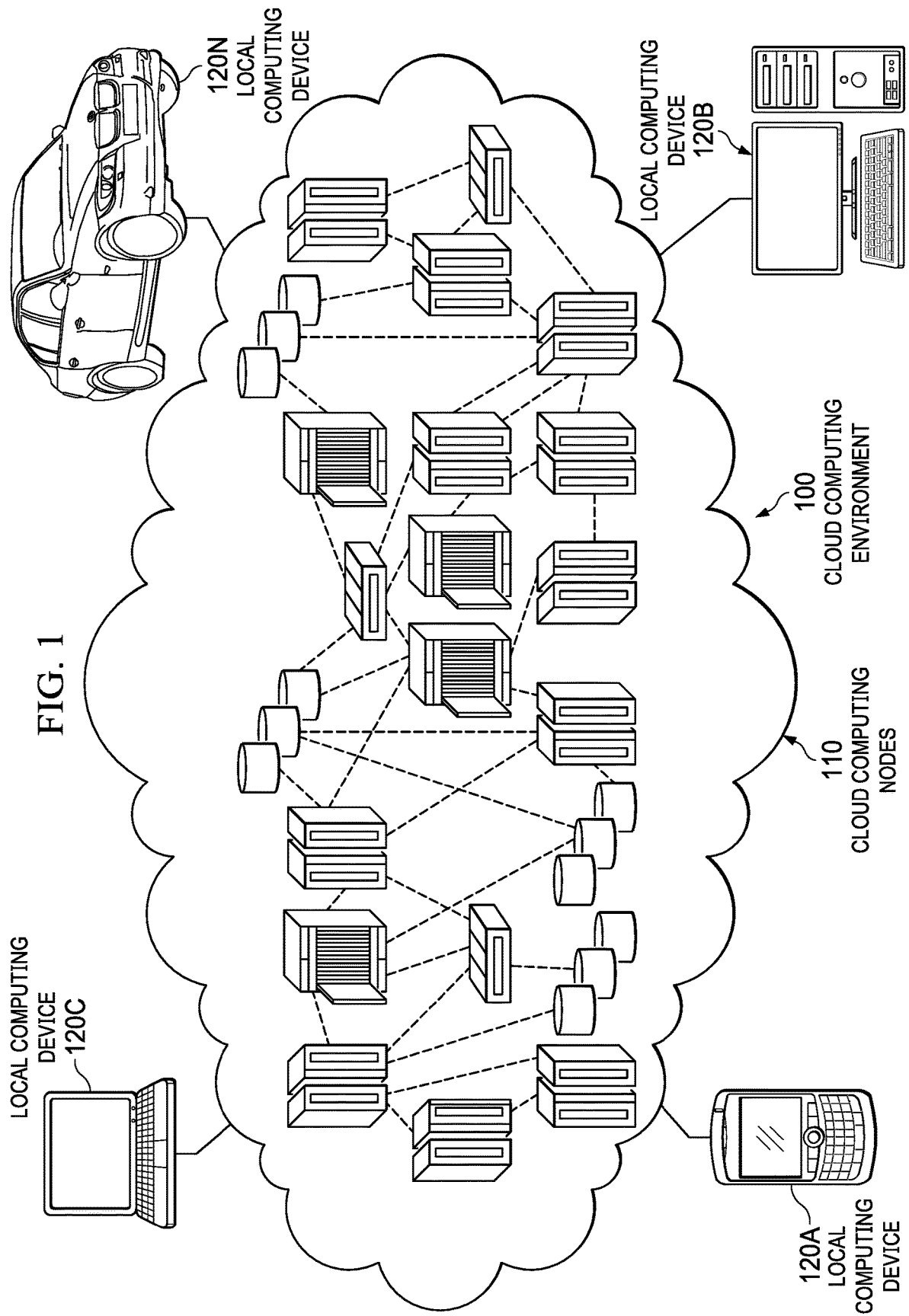
FIG. 1 is a diagram illustrating a cloud computing environment in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference now to FIG. 1, a diagram illustrating a cloud computing environment is depicted in which illustrative embodiments may be implemented. In this illustrative example, cloud computing environment 100 includes a set of one or more cloud computing nodes 110 with which local computing devices used by cloud consumers, such as, for example, personal digital assistant or smart phone 120A, desktop computer 120B, laptop computer 120C, and/or automobile computer system 120N, may communicate.

Cloud computing nodes 110 may communicate with one another and may be grouped physically or virtually into one or more networks, such as private, community, public, or hybrid clouds as described hereinabove, or a combination thereof. This allows cloud computing environment 100 to offer infrastructure, platforms, and/or software as services for which a cloud consumer does not need to maintain resources on a local computing device, such as local computing devices 120A-120N. It is understood that the types of local computing devices 120A-120N are intended to be illustrative only and that cloud computing nodes 110 and cloud computing environment 100 can communicate with any type of computerized device over any type of network and/or network addressable connection using a web browser, for example.

Figure 2:
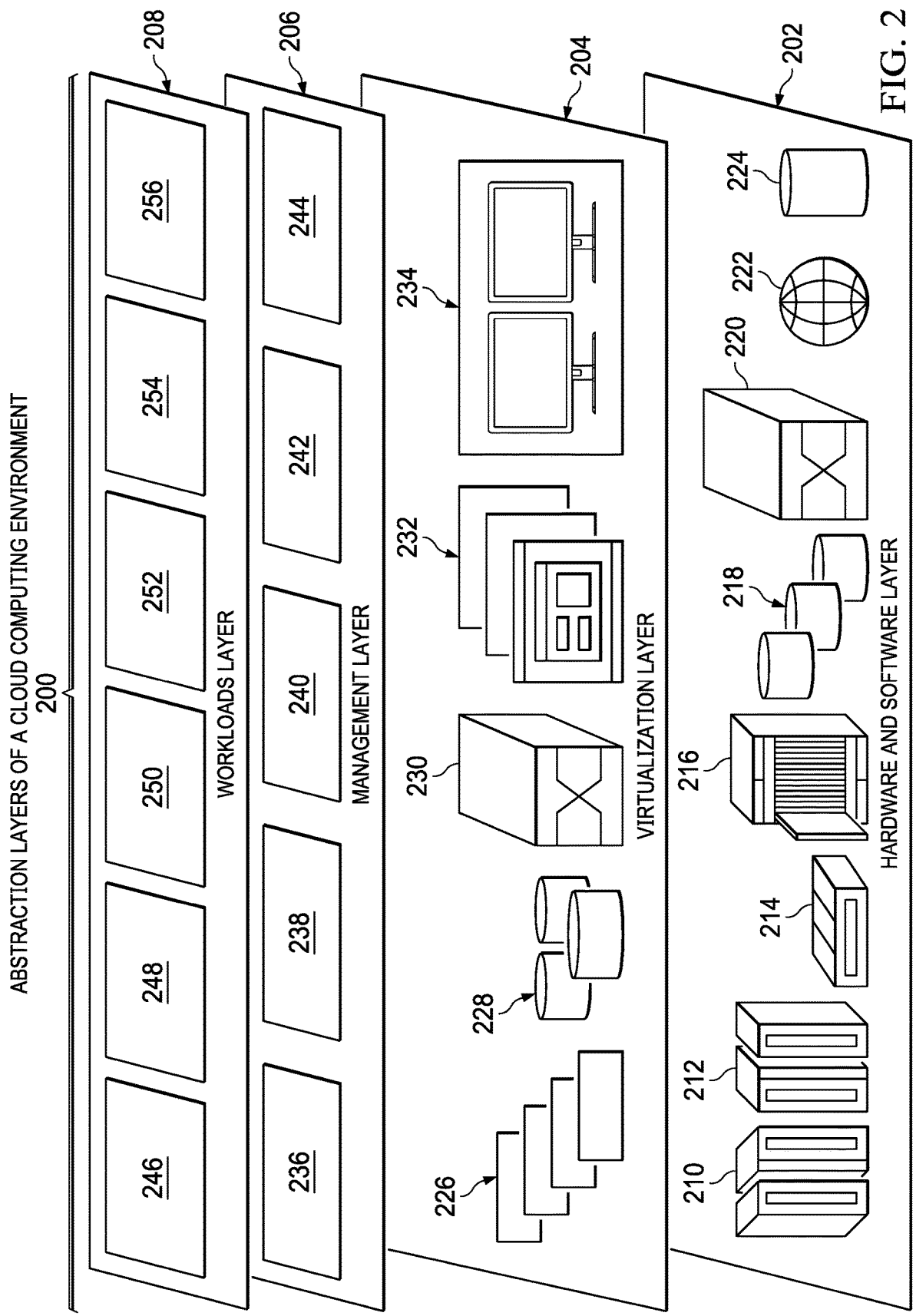
FIG. 2 is a diagram illustrating abstraction model layers in accordance with an illustrative embodiment.

With reference now to FIG. 2, a diagram illustrating abstraction model layers is depicted in accordance with an illustrative embodiment. The set of functional abstraction layers shown in this illustrative example may be provided by a cloud computing environment, such as cloud computing environment 100 in FIG. 1. It should be understood in advance that the components, layers, and functions shown in FIG. 2 are intended to be illustrative only and embodiments of the invention are not limited thereto. As depicted, the following layers and corresponding functions are provided.

Further, as used herein, a "set of" when used with reference to items means one or more items. For example, a set of functional abstraction layers is one or more functional abstraction layers.

Abstraction layers of a cloud computing environment 200 include hardware and software layer 202, virtualization layer 204, management layer 206, and workloads layer 208. Hardware and software layer 202 includes the hardware and software components of the cloud computing environment. The hardware components may include, for example, mainframes 210, RISC (Reduced Instruction Set Computer) architecture-based servers 212, servers 214, blade servers 216, storage devices 218, and networks and networking components 220. In some illustrative embodiments, software components may include, for example, network application server software 222 and database software 224.

Virtualization layer 204 provides an abstraction layer from which the following examples of virtual entities may be provided: virtual servers 226; virtual storage 228; virtual networks 230, including virtual private networks; virtual applications and operating systems 232; and virtual clients 234.

In one example, management layer 206 may provide the functions described below. Resource provisioning 236 provides dynamic procurement of computing resources and other resources, which are utilized to perform tasks within the cloud computing environment. Metering and pricing 238 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 240 provides access to the cloud computing environment for consumers and system administrators. Service level management 242 provides cloud computing resource allocation and management such that required service levels are met. Service level agreement (SLA) planning and fulfillment 244 provides pre-arrangement for, and procurement of, cloud computing resources for which a future requirement is anticipated in accordance with an SLA.

Workloads layer 208 provides examples of functionality for which the cloud computing environment may be utilized. Example workloads and functions, which may be provided by workload layer 208, may include mapping and navigation 246, software development and lifecycle management 248, virtual classroom education delivery 250, data analytics processing 252, transaction processing 254, and connection pool management system 256. In the illustrative example, connection pool management system 256 can implement features in which connections from different user groups can be predicted and the predictions can be used to manage connections pools in a manner that increase performance in accessing backend systems.

Figure 3:
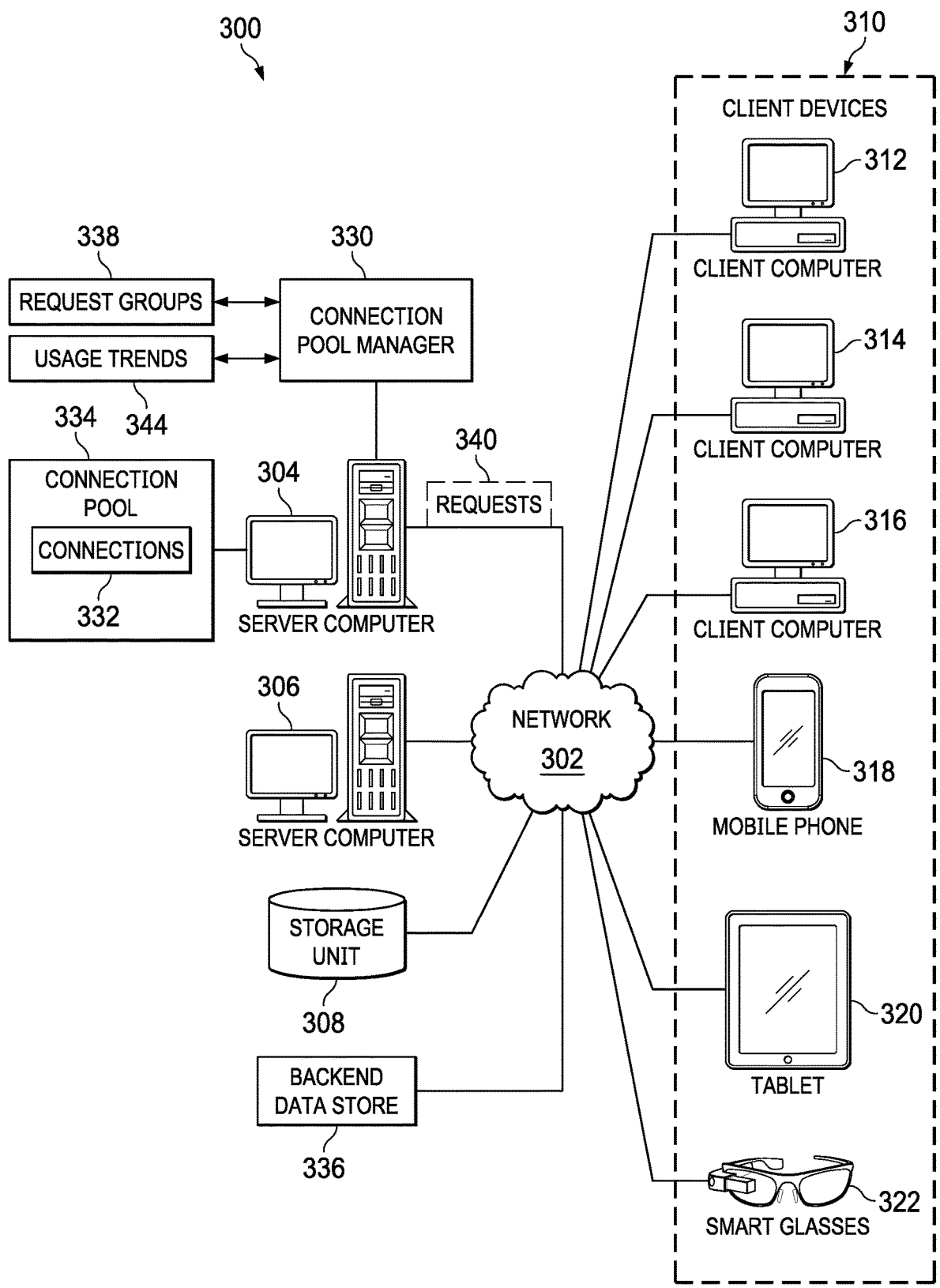
FIG. 3 is a pictorial representation of a network of data processing systems in which illustrative embodiments may be implemented.

With reference now to FIG. 3, a pictorial representation of a network of data processing systems is depicted in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server computer 304 and server computer 306 connect to network 302 along with storage unit 308. In addition, client devices 310 connect to network 302. As depicted, client devices 310 include client computer 312, client computer 314, and client computer 316. Client devices 310 can be, for example, computers, workstations, or network computers. In the depicted example, server computer 304 provides information, such as boot files, operating system images, and applications to client devices 310. Further, client devices 310 can also include other types of client devices such as mobile phone 318, tablet computer 320, and smart glasses 322. In this illustrative example, server computer 304, server computer 306, storage unit 308, and client devices 310 are network devices that connect to network 302 in which network 302 is the communications media for these network devices. Some or all of client devices 310 may form an Internet-of-things (IoT) in which these physical devices can connect to network 302 and exchange information with each other over network 302.

Client devices 310 are clients to server computer 304 in this example. Network data processing system 300 may include additional server computers, client computers, and other devices not shown. Client devices 310 connect to network 302 utilizing at least one of wired, optical fiber, or wireless connections.

Program code located in network data processing system 300 can be stored on a computer-recordable storage media and downloaded to a data processing system or other device for use. For example, program code can be stored on a computer-recordable storage media on server computer 304 and downloaded to client devices 310 over network 302 for use on client devices 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 300 also may be implemented using a number of different types of networks. For example, network 302 can be comprised of at least one of the Internet, an intranet, a local area network (LAN), a metropolitan area network (MAN), or a wide area network (WAN). FIG. 3 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, connection pool manager 330 can manage the allocation of connections 332 in connection pool 334 for use in accessing backend data store 336. In this illustrative example, connections 332 are connections that have been pre-populated in connection pool 334 for use to access backend data store 336. With connections 332 the overhead of creating a new connection and removing a connection when disconnecting each time a connection is requested can be avoided.

In this illustrative example, connection pool manager 330 enables increased performance in using a connection from connection pool 334 to access backend data store 336. Connection pool manager 330 can allocate connections 332 based on request groups 338 identified by authentication data received by connection pool manager 330 in requests 340 from requestors for connections 332.

Connection pool manager 330 analyzes prior requests made from requestors to identify request groups 338 and determine usage trends 344 for request groups 338. The requestors can be selected from at least one of an application, a client, a web browser, or some processor or software component that requests a connection to access backend data store 336.

These usage trends can be used to make predictions on future requests for connections 332 in connection pool 334 by requestors in request groups 338. The predictions can be used to allocate connections 332 to request groups 338 based on the predictions of usage by request groups 338.

Figure 4:
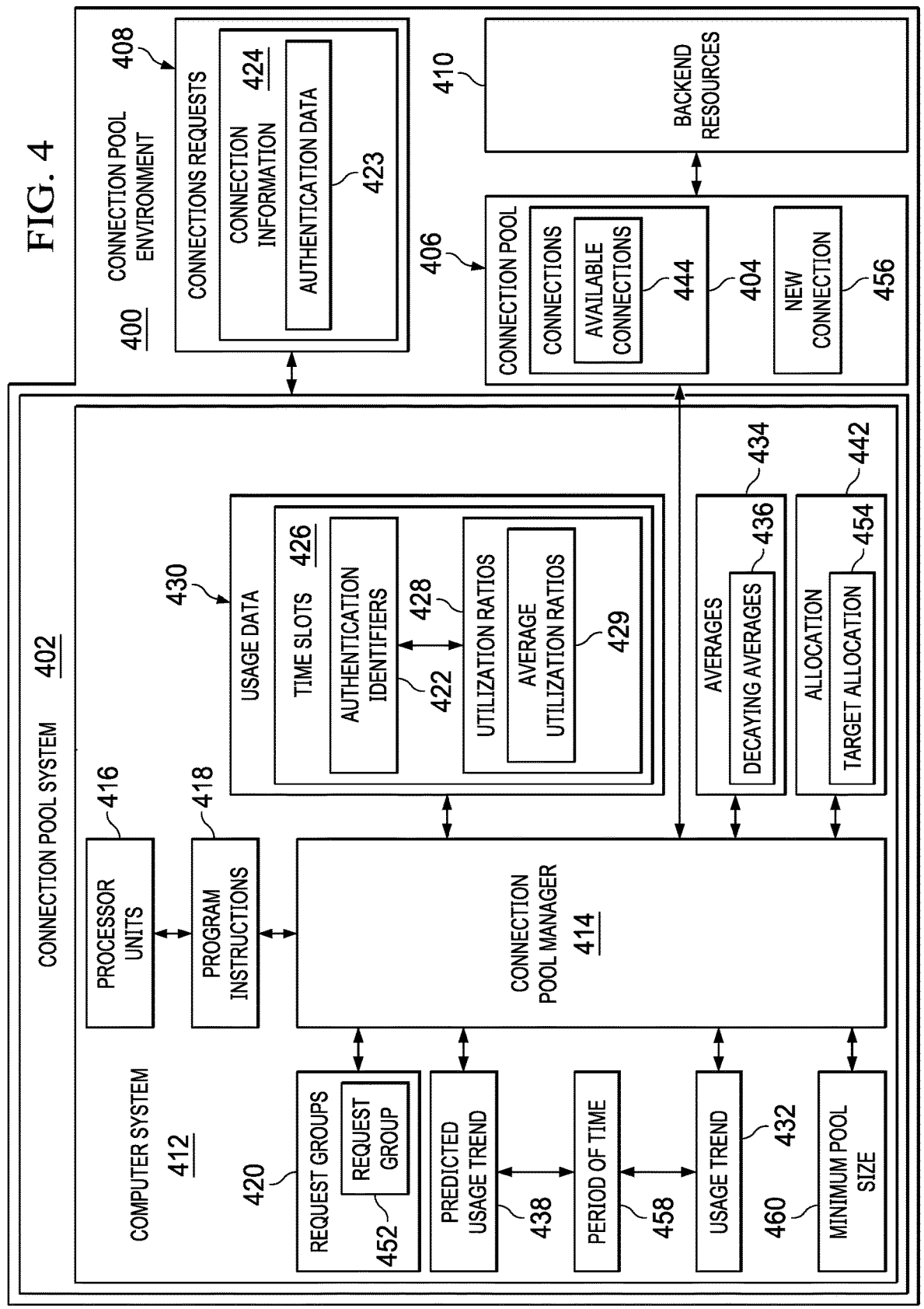
FIG. 4 is a block diagram of a connection pool environment in accordance with an illustrative embodiment.

With reference now to FIG. 4, a block diagram of a connection pool environment is depicted in accordance with an illustrative embodiment. In this illustrative example, connection pool environment 400 includes components that can be implemented in hardware such as the hardware shown in network data processing system 300 in FIG. 1.

In connection pool environment 400, connection pool system 402 can manage the allocation of connections 404 in connection pool 406. In this illustrative example, connections 404 can be allocated in response to receiving connection requests 408 to access a set of backend resources 410. In this illustrative example, the set of backend resources 410 can be a number of different types of components. For example, the set of backend resources 410 is selected from at least one of backend datastore, a database, an enterprise information system (EIS), a Java messaging system (JMS), or other suitable types of resources.

In this illustrative example, connection pool system 402 comprises a number of different components. As depicted, connection pool system 402 comprises computer system 412 and connection pool manager 414.

Connection pool manager 414 can be implemented in software, hardware, firmware or a combination thereof. When software is used, the operations performed by connection pool manager 414 can be implemented in program instructions configured to run on hardware, such as a processor unit. When firmware is used, the operations performed by connection pool manager 414 can be implemented in program instructions and data and stored in persistent memory to run on a processor unit. When hardware is employed, the hardware can include circuits that operate to perform the operations in connection pool manager 414.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 412 is a physical hardware system and includes one or more data processing systems. When more than one data processing system is present in computer system 412, those data processing systems are in communication with each other using a communications medium. The communications medium can be a network. The data processing systems can be selected from at least one of a computer, a server computer, a tablet computer, or some other suitable data processing system.

As depicted, computer system 412 includes a number of processor units 416 that are capable of executing program instructions 418 implementing processes in the illustrative examples. As used herein a processor unit in the number of processor units 416 is a hardware device and is comprised of hardware circuits such as those on an integrated circuit that respond and process instructions and program code that operate a computer. When a number of processor units 416 execute program instructions 418 for a process, the number of processor units 416 is one or more processor units that can be on the same computer or on different computers. In other words, the process can be distributed between processor units on the same or different computers in a computer system. Further, the number of processor units 416 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

As depicted, connection pool manager 414 manages connections 404 in connection pool 406. For example, connection pool manager 414 can perform a startup for connection pool 406, perform maintenance on connections 404, remove stale connections in connections 404, allocate connections 404 in response to receiving connection requests 408, and other suitable operations.

In this illustrative example, connection pool manager 414 monitors connection requests 408 to access the set of backend resources 410. In monitoring connection requests 408, connection pool manager 414 can store authentication identifiers 422 for authentication data 423 in connection information 424 received in connection requests 408 for request groups 420 in time slots 426 based on when connection requests 408 were received. In other illustrative examples, the time slots may be based on timestamps in connection request 408. Authentication identifier 422 from the connection requests 408 can be paired with utilization ratios 428 for respective connection requests can be stored within time slots 426 stored as usage data 430. In this example, utilization ratios 428 can be average utilization ratios 429. In other words, an authentication identifier for connection request can be paired with the average utilization ratio for that authentication identifier request within the time slot. In the illustrative example, the average utilization ratio is the ratio of connection time used by the authentication identifier in the time slot relative to connection time used by all authentication identifiers in the time slot.

Time slots 426 are periodic and can have different durations. In other words, all of time slots 426 have the same length. Time slots 426 can be, for example, 10 minutes, one hour, three hours, or some other period of time.

In this illustrative example, analyzing or storing authentication data such as user IDs, passwords, or keys is unnecessary. As result, this process does not increase security issues.

Connection pool manager 414 identifies request groups 420 for connection requests 408 based on authentication data 423 in the connection requests 408. For example, connection pool manager 414 can classify connection requests 408 into request groups 420 based on authentication identifiers 422 in connection requests 408. In some illustrative examples, the classification can be performed as connection requests 408 are received and their corresponding connections are returned to connection pool 406 after the full duration of their usage by the requestor has elapsed. In other illustrative examples, the identification of request groups 420 by connection pool manager 414 can be determined from usage data 430 stored in a database.

In this illustrative example, connection pool manager 414 analyzes the connection requests 408 to identify usage trend 432 for connections 404 by request groups 420. In this illustrative example, usage trend 432 can be determined in a number of different ways. For example, connection pool manager 414 can determine averages 434 for the usage of connections 404 by request groups 420 in time slots 426.

Connection pool manager 414 can determine averages 434 in the form of decaying averages 436 for a usage of connections 404 by request groups 420 in time slots 426. In this example, a decaying average can be determined for each request group in request groups 420 in a time slot in time slots 426. With decaying averages 436, a heavier weighting is provided to more recent connection requests in connection request 408. Connection pool manager 414 can determine a trend of decaying averages 436 to identify usage trend 432.

As depicted, connection pool manager 414 predicts usage trend 432 of connections 404 for a period of time 458 to form predicted usage trend 438 for connections 404 in the period of time 458. In this illustrative example, period of time 458 can vary in length depending on the particular implementation. Period of time 458 can be a time slot in time slots 426, be two or more time slots in time slots 426, cross over two of time slots 426, or have some other length or alignment. Predicted usage trend 438 can be used to manage connection pool 406 in a manner that improves the performance of computer system 412 in providing access to the set of backend resources 410.

In this example, connection pool manager 414 manages connection pool 406 based on predicted usage trend 438 for connections 404 in the set of time slots 426. Connection pool manager 414 can manage connection pool 406 for a set of time slots 426 based on predicted usage trend 438 for connections 404 in response to an event selected from at least one of a startup of connection pool 406, performing maintenance on connections 404, removing a stale connection from connections 404, or some other suitable event. As another example, the event can be a user request to allocate or reallocate connections 404.

In startup, connection pool manager 414 can pre-allocate connections 404 in connection pool 406 in period of time 458 based on ratios of request groups 420 predicted in predicted usage trend 438 for use of connections 404 in the period of time 458. During maintenance, connection pool manager 414 can remove any number of connections from connections 404 which have been determined to be stale, have exceeded a maximum duration for lifespan, have exceeded a maximum duration for idleness, or meet any other condition for which the connection pool manager 414 determines connections 404 are fit for removal.

In other words, connection pool manager 414 can manage the allocation or assignment of connections 404 in connection pool 406 based on what request groups are specified in connection requests 408.

For example, connection pool manager 414 can remove an allocation of a connection in connections 404 in connection pool 406 when the connection has not been used for some threshold period of time. The threshold period of time can be, for example, 10 minutes, 30 minutes, 2 hours, or some other period of time. The time slot from the connection that is freed up can be allocated to another connection using predicted usage trend 438 for use of connections 404 in the set of time slots 426. When a connection was usable and is no longer useable, that connection is considered stale and can be removed. A connection can be considered stale in different situations, such as a network time out or a network issue. At this point, connection pool manager 414 can allocate new connection 456 to connection pool 406 if the number of connections 404 in connection pool 406 falls below minimum pool size 460 for connection pool 406. In managing connection pool 406, connection pool manager 414 can determine an allocation 442 of connections 404 to request groups 420 for period of time 458 using predicted usage trend 438 for connections 404. Allocation 442 can take a number of different forms. For example, allocation 442 can be a number of connections 404 for each request group and request groups 420. In another illustrative example, allocation 442 can take the form of ratios. Each group can have a target ratio that is applied to the number of connections 404. As a result, when the number connections 404 changes, the allocations connections 404 can still be performed using the target ratios for request groups 420 in allocation 442.

In this example, connection pool manager 414 can allocate available connections 444 in connections 404 to request groups 420 based on allocation 442 of connections 404 to request groups 420 for period of time 458. When the number of connections 404 in connection pool 406 falls below minimum pool size 460 for connection pool 406, new connection 456 can be created in connection pool 406. In illustrative example, one or more new connections can be generated for connection pool 406 in addition to new connection 456 depending on how far the number connections 404 fall below minimum pool size 460.

New connection 456 can be assigned to a request group 452 in request groups 420 that is furthest below target allocation 454 in allocation 442 of connections 404 in connection pool 406 to request groups 420 for period of time 458.

As a result, connection pool system 402 can dynamically manage connections 404 in connection pool 406 based on classifying different types of authentication data 423 in connection request 408 into request groups 420. This information can be used to predict future usage of connections 404 by different types of authentication mechanisms as classified into request groups 420. As depicted, this prediction can be made for a period of time 458. In this example, period of time 458 can be a time slot in time slots 426, a series of time slots 426, or portions of time slots 426 to automatically repopulate or maintain connections 404 in connection for 406 at a desired target size. As a result, connection pool system 402 does not need to preconfigure target ratios or schedules for usage of connections 404 using current techniques. This use of authentication data 423 to identify request groups 420 and predicted usage of connections 404 by request groups 420 during different time slots can provide a dynamic and automatic mechanism for managing connections 404 and connection pool 406 that provides increased performance in accessing backend resources 410 as compared to current techniques.

In one illustrative example, one or more technical solutions are present that overcome an issue with increasing performance to accessing backend resources. As a result, one or more illustrative examples can enable increasing the performance of accessing backend resources through managing connection pools for use in accessing those backend resources.

Computer system 412 can be configured to perform at least one of the steps, operations, or actions described in the different illustrative examples using software, hardware, firmware or a combination thereof. As a result, computer system 412 operates as a special purpose computer system in which connection pool manager 414 in computer system 412 enables managing connections based on predicting the types of requests received based on the authentication mechanisms identified in the connection data and connection requests. In particular, connection pool manager 414 transforms computer system 412 into a special purpose computer system as compared to currently available general computer systems that do not have connection pool manager 414.

In the illustrative example, the use of connection pool manager 414 in computer system 412 integrates processes into a practical application for managing connections in a manner that increases the performance of computer system 412. In other words, connection pool manager 414 in computer system 412 is directed to a practical application of processes integrated into connection pool manager 414 in computer system 412 that monitors connection requests; identifies request groups for the connection requests based on the indication data; predicts usage trends for connections in a set of time slots; and manages a pool of connections based on the predicted usage trends for connections. With the use of connection pool manager 414 to manage a connection pool, increased performance in computer system 412 can occur in providing desired response times for requests to backend resources such as databases, messaging systems, data stores, or other types of backend resources.

The illustration of connection pool environment 400 in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 5:
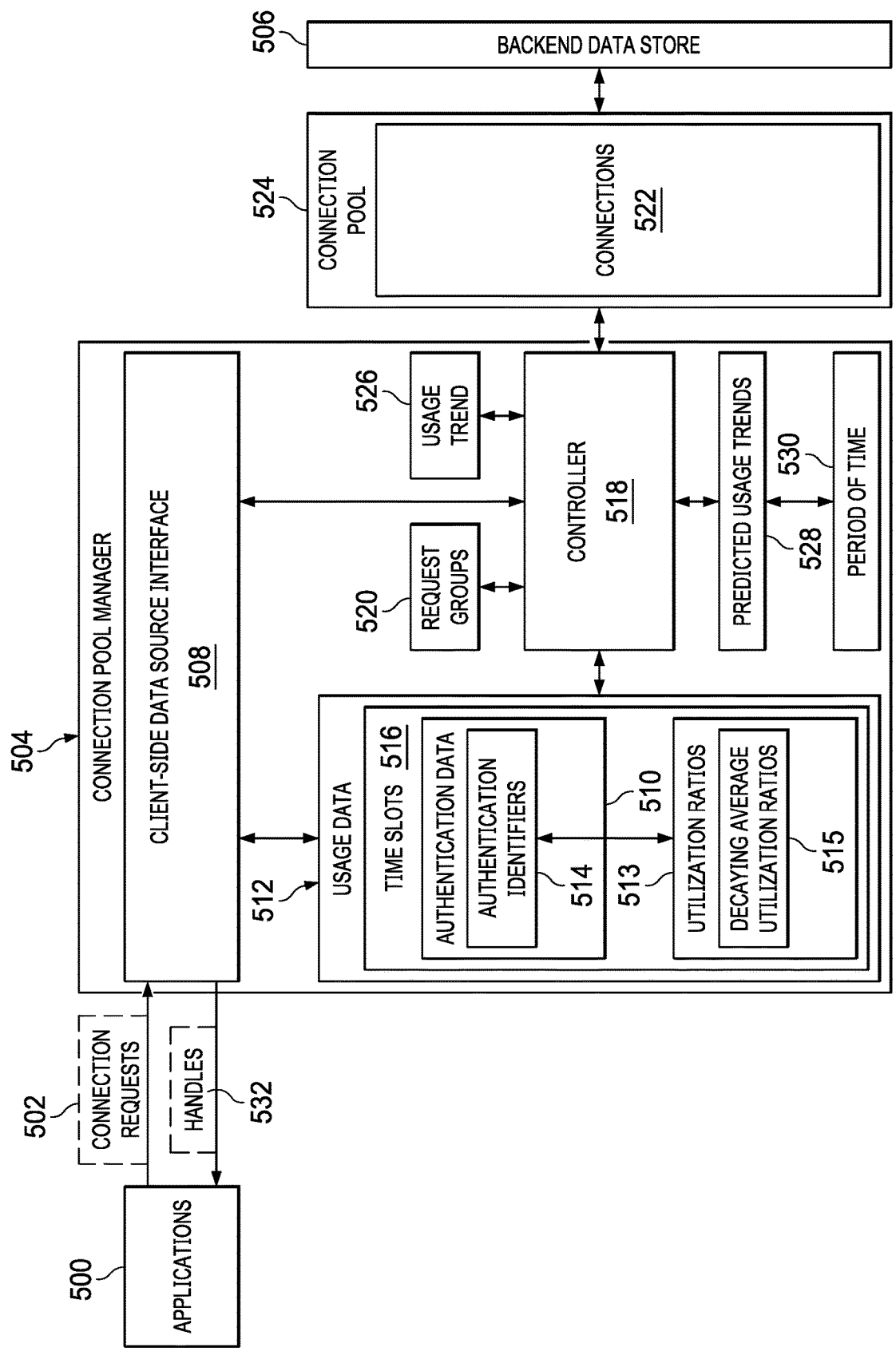
FIG. 5 is a dataflow diagram for managing connections in accordance with an illustrative embodiment.

With reference next to FIG. 5, a dataflow diagram for managing connections is depicted in accordance with an illustrative embodiment. The dataflow in this illustrative example can be implemented using connection pool system 402 in FIG. 2.

In this illustrative example, applications 500 send connection requests 502 to connection pool manager 504 to access backend data store 506. Backend data store 506 is an example of a backend resource in backend resources 410 in FIG. 4. These connection requests are received by client-side data source interface 508 in connection pool manager 504.

As depicted, client-side data source interface 508 stores some of authentication data 510 from connection requests 502 in usage data 512. In this illustrative example, authentication data 510 includes authentication identifier (authDataIds) 514. Each connection request includes an authentication identifier (authDataId) uniquely identifying the type of authentication to use when establishing the connection.

For example, a first authentication identifier may identify a specific database user identifier and password combination as the authentication mechanism. A second authentication identifier may identify a specific Kerberos principal as the authentication mechanism. Authentication data 510 can include other data that is not stored. The user ID and password or a ticket are examples of other information in authentication data 510 which may be present but not stored in usage data 512.

As depicted, client-side data source interface 508 stores authentication identifiers 514 in time slots 516 in usage data 512. Additionally, authentication identifiers 514 can be stored with utilization ratios 513 in the form of decaying average utilization ratios 515 in time slots 516. In other words, each authentication identifier can be paired with a decaying average of its observed ratio of usage within the time slot. The storage of authentication identifiers 514 in time slots 516 is based on when connection requests 502 are received and the decaying average is weighted proportionally to how long the requestor held onto the requested connection before returning it to the connection pool. Time slots 516 are periodic intervals of time. Each time slot in time slots 516 can be one minute, five minutes, 17 minutes, 1 hour, 2 hours, or some other suitable time.

In this illustrative example, controller 518 can classify authentication identifiers 514 stored in usage data 512 into request groups 520. Each request group and request groups 520 correspond to a particular authentication identifier in authentication identifiers 514. In other words, the authentication identifier is unique to the set of authentication data that is used and not unique to a particular requester. Usage data 512 can be used by controller 518 to manage connections 522 in connection pool 524. In this illustrative example, connections 522 are connections to backend data store 506 and can be assigned to requesters such as applications 500 for use in accessing backend data store 506.

In this illustrative example, the manner in which controller 518 assigns connections 522 in connection pool 524 can be determined from authentication data 510 in usage data 512. Controller 518 analyzes authentication data 510 stored in usage data 512 to identify request groups 520. More specifically, controller 518 can use authentication identifiers 514 in authentication data 510 to identify request groups 520. Each authentication identifier in authentication identifiers 514 corresponds to a request group in request groups 520 in this example. More specifically, controller 518 can identify the use of connections 522 over time from authentication identifiers 514 in authentication data 510 stored in time slots 516.

For example, controller 518 can identify usage trend 526 recurring in time slots 516. In the illustrative example, controller 518 can calculate decaying averages of the utilization ratio for each authentication data identifier for each time slot in time slots 516. This decaying average can be represented as a ratio of connection usage by request groups 520. Usage trend 526 can be based on the decaying averages determined for connection requests 502 for time slots 516 in usage data 512.

This usage trend can be used by controller 518 to determine predicted usage trend 528 for connections 522 for period of time 530. The time can be the current time or a future period of time. Further, predicted usage trend 528 can be for multiple periods of time.

In this example, controller 518 can determine predicted usage trend 528 from usage trend 526. In this illustrative example, the determination of predicted usage trend 528 for period of time 530 can be performed using any currently available trend analysis technique in which historical data such as patterns in usage trend 526 can be used to predict predicted usage trend 528.

In this illustrative example, controller 518 can assign connections 522 in connection pool 524 to applications 500 in response to connection requests 502 using predicted usage trend 528. In this example, the predicted usage trend can be predicted use of connections 522 by different request groups in request groups 520.

This predicted usage trend can be used to determine whether a request group requesting a connection is assigned a connection based on predicted usage trend 528. For example, a predicted usage can be used to determine the ratios of connections 522 in connection pool 524 that are anticipated to be used by request groups 520. For example, predicted usage trend 528 can predict the usage of connections 522 by request groups 520 such as authA, authB, and authC for a time slot for Tuesday from 8:00 to 9:00 am. In this example, predicted usage trend 528 can provide ratios of usage such as, authA=0.6, authB=0.3, and authC=0.1. These ratios indicate a distribution of connections 522 that can be made for this particular time slot.

As a result, if connection pool 524 contains 10 connections, the anticipated usage of connections 522 is 6 connections for authA, 3 connections for authB, and one connection for authC. The anticipated usage of connections 522 form a distribution that can be used to pre-assign connections 522 for that particular time slot or a selected period of time. If a connection request is received for authA, controller 518 determines how many connections are currently assigned to the request group authA. For example, if 5 connections are assigned to authA, controller 518 will assign an available connection to the requester. In another illustrative example, if 6 connections are assigned to authA, controller 518 can optionally not assign a connection to the requester even if a connection is available.

When connections 522 are assigned to applications 500 by controller 518 in response to connection requests 502, client-side data source interface 508 returns handles 532 to applications 500. In other words, a handle in handles 532 is returned for each connection in connections 522 assigned to an application in applications 500 requesting the connection.

As a result, controller 518 can determine how to allocate connections 522 in connection pool 524 to applications 500 in response to connection requests 502 using predicted usage trend 528. As connection requests 502 continue to be received, usage data 512 can be updated and updated usage trends can be determined and used to update predicted usage trend 528. Further, if actual usage of connections changes over time, the calculation of decaying averages can ensure that the distribution of connections 522 to request groups 520 also adjusts. Additionally, anomalies that may occur may disappear into the average can be handled by existing connection pool management mechanisms. For example, connection pool 524 can be increased temporarily on-demand in some illustrative examples.

The illustration of dataflow in FIG. 5 is an example of one manner in which dataflow can occur in managing a connection pool. This illustration is not meant to limit the manner in which other list of examples can be implemented. For example, in other illustrative examples connection pool 524 can be used to access a backend resource such as a database or messaging system instead of backend data store 506. In yet other illustrative examples, client-side data source interface 508 can be implemented as part of controller 518. In yet other illustrative examples, predicted usage trends can be for one or more periods of time in addition to or in place of period of time 530.

Figure 6:
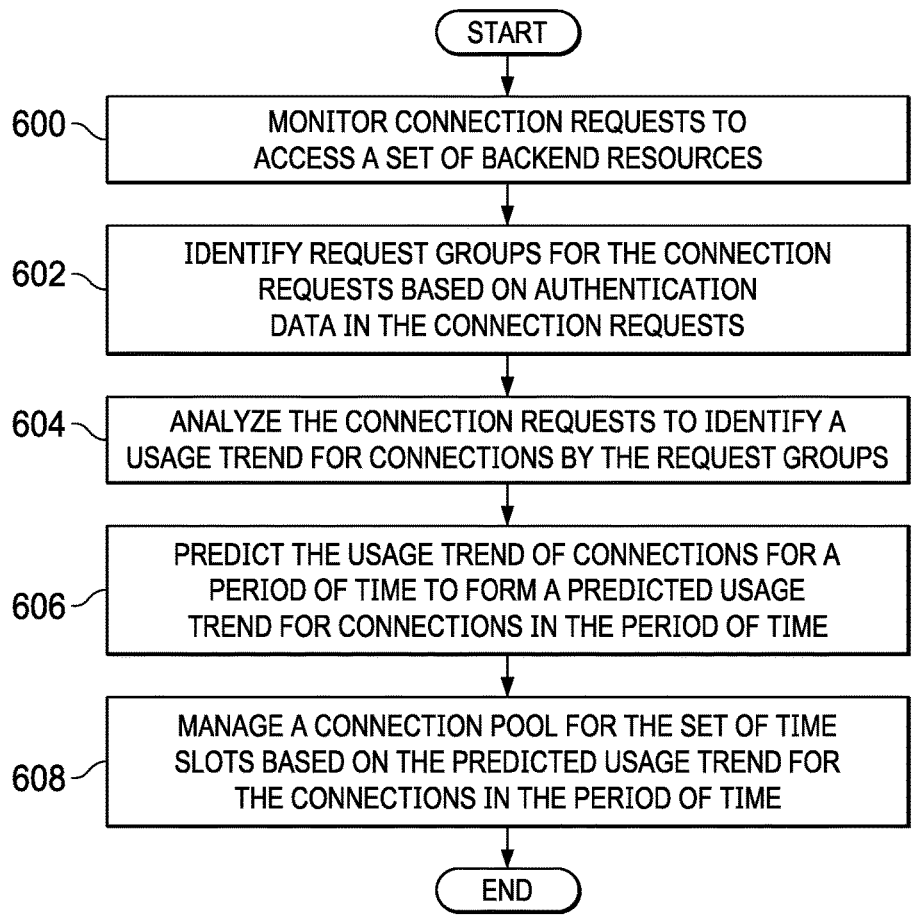
FIG. 6 is a flowchart of a process for managing connections in accordance with an illustrative embodiment.

Turning next to FIG. 6, a flowchart of a process for managing connections is depicted in accordance with an illustrative embodiment. The process in FIG. 6 can be implemented in hardware, software, or both. When implemented in software, the process can take the form of program instructions that is run by one of more processor units located in one or more hardware devices in one or more computer systems. For example, the process can be implemented in connection pool manager 414 in computer system 412 in FIG. 4.

The process begins by monitoring connection requests to access a set of backend resources (step 600). The process identifies request groups for the connection requests based on authentication data in the connection requests (step 602). The process analyzes the connection requests to identify a usage trend for of the connections by the request groups (step 604). The process predicts the usage trend of the connections for a period of time to form a predicted usage trend for connections in the period of time (step 606). The period of time can be a time slot, consecutive series of time slots, or comprises portions of two adjacent time slots, consecutive series of time slots and a portion of an adjacent time slot, or some other period of time. The processing manages a connection pool based on the predicted usage trend for the connections in the period of time (step 608). The process terminates thereafter.

Figure 7:
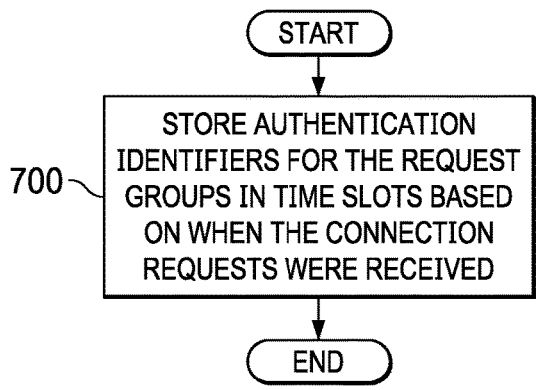
FIG. 7 is a flowchart of a process for monitoring requests in accordance with an illustrative embodiment.

With reference now to FIG. 7, a flowchart of a process for monitoring requests is depicted in accordance with an illustrative embodiment. The process in this figure is an example of an implementation for step 600 in FIG. 6.

The process stores authentication identifiers for the request groups in time slots based on when the connection requests were received (step 700). The process terminates thereafter.

Figure 8:
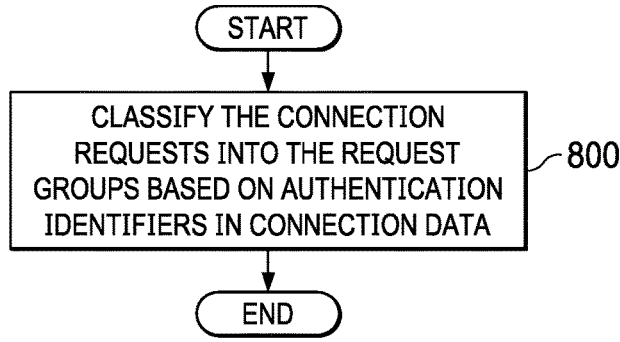
FIG. 8 is a flowchart of a process for identifying request groups in accordance with an illustrative embodiment.

Turning to FIG. 8, a flowchart of a process for identifying request groups is depicted in accordance with an illustrative embodiment. The process in this figure is an example of an implementation for step 602 in FIG. 6.

The process classifies the connection requests into the request groups based on authentication identifiers in connection data (step 800). The process terminates thereafter.

Figure 9:
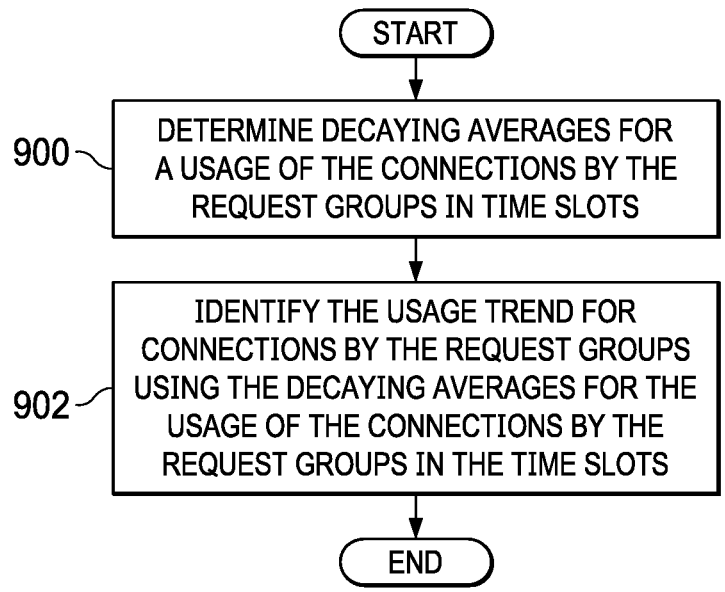
FIG. 9 is a flowchart of a process for analyzing connection requests in accordance with an illustrative embodiment.

In FIG. 9, a flowchart of a process for analyzing connection requests is depicted in accordance with an illustrative embodiment. The process in this figure is an example of an implementation for step 604 in FIG. 6.

The process determines decaying averages for a usage of the connections by the request groups in time slots (step 900). The process identifies the usage trend for connections by the request groups using the decaying averages for the usage of the connections by the request groups in the time slots (step 902). The process terminates thereafter.

Figure 10:
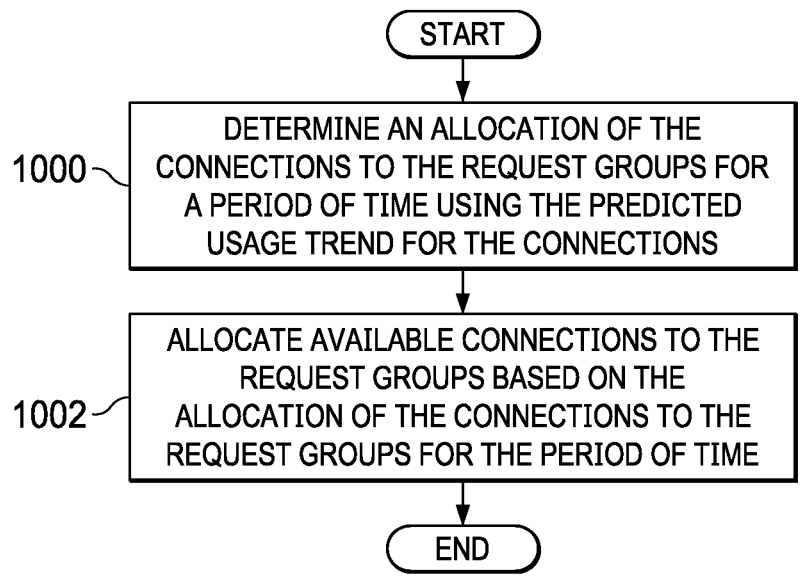
FIG. 10 is a flowchart of a process for managing the connection pool in accordance with an illustrative embodiment.

With reference now to FIG. 10, a flowchart of a process for managing the connection pool is depicted in accordance with an illustrative embodiment. The process in this figure is an example of an implementation for step 608 in FIG. 6.

The process determines an allocation of the connections to the request groups for a period of time using the predicted usage trend for the connections (step 1000). The process allocates available connections to the request groups based on the allocation of the connections to the request groups for the period of time (step 1002). The process terminates thereafter.

Figure 11:
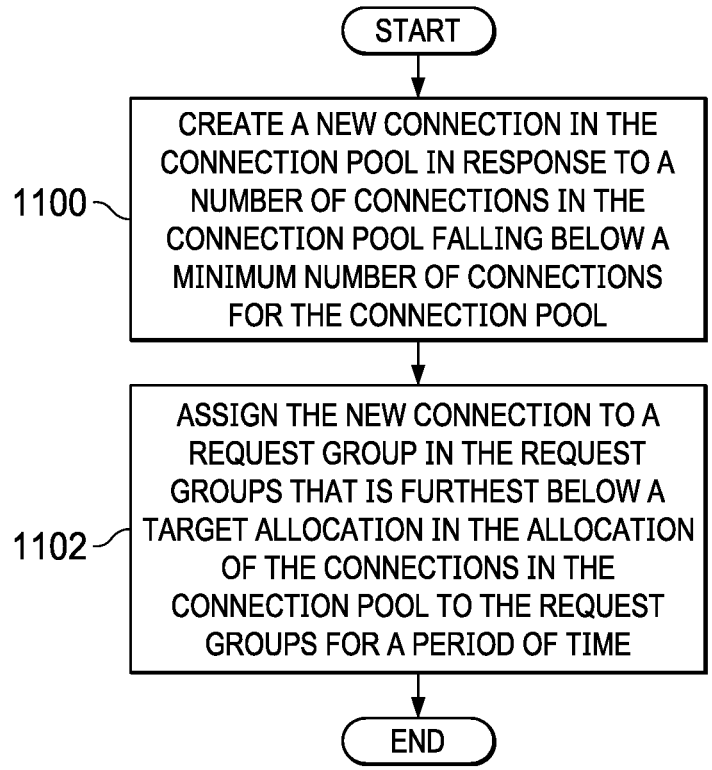
FIG. 11 is a flowchart of a process for managing the connection pool in accordance with an illustrative embodiment.

Turning to FIG. 11, a flowchart of a process for managing a connection pool is depicted in accordance with an illustrative embodiment. The process in this figure is an example of an implementation for step 608 in FIG. 6.

The process creates a new connection in the connection pool in response to a number of connections in the connection pool falling below a minimum number of connections for the connection pool (step 1100). The process assigns the new connection to a request group in the request groups that is furthest below a target allocation in the allocation of the connections in the connection pool to the request groups for a period of time (step 1102). The process terminates thereafter.

Figure 12:
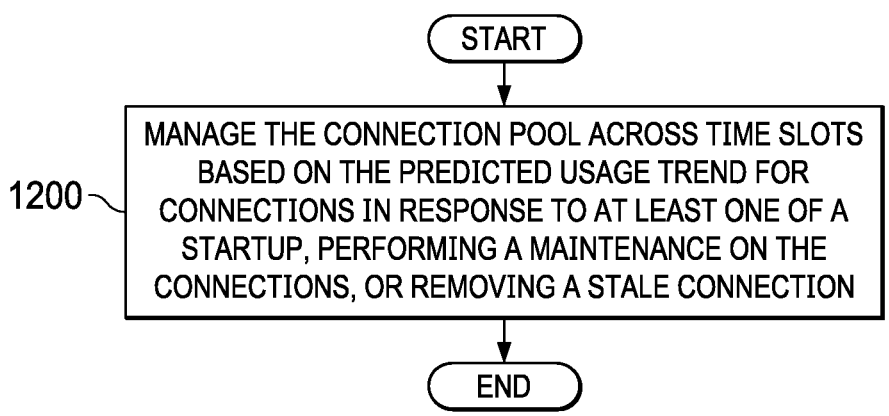
FIG. 12 is a flowchart of a process for managing the connection pool in accordance with an illustrative embodiment.

With reference to FIG. 12, a flowchart of a process for managing the connection pool is depicted in accordance with an illustrative embodiment. The process in this figure is an example of an implementation for step 608 in FIG. 6.

The process manages the connection pool based on the predicted usage trend across time slots for connections in response to at least one of a startup, performing a maintenance on the connections, or removing a stale connection (step 1200). The process terminates thereafter.

Figure 13:
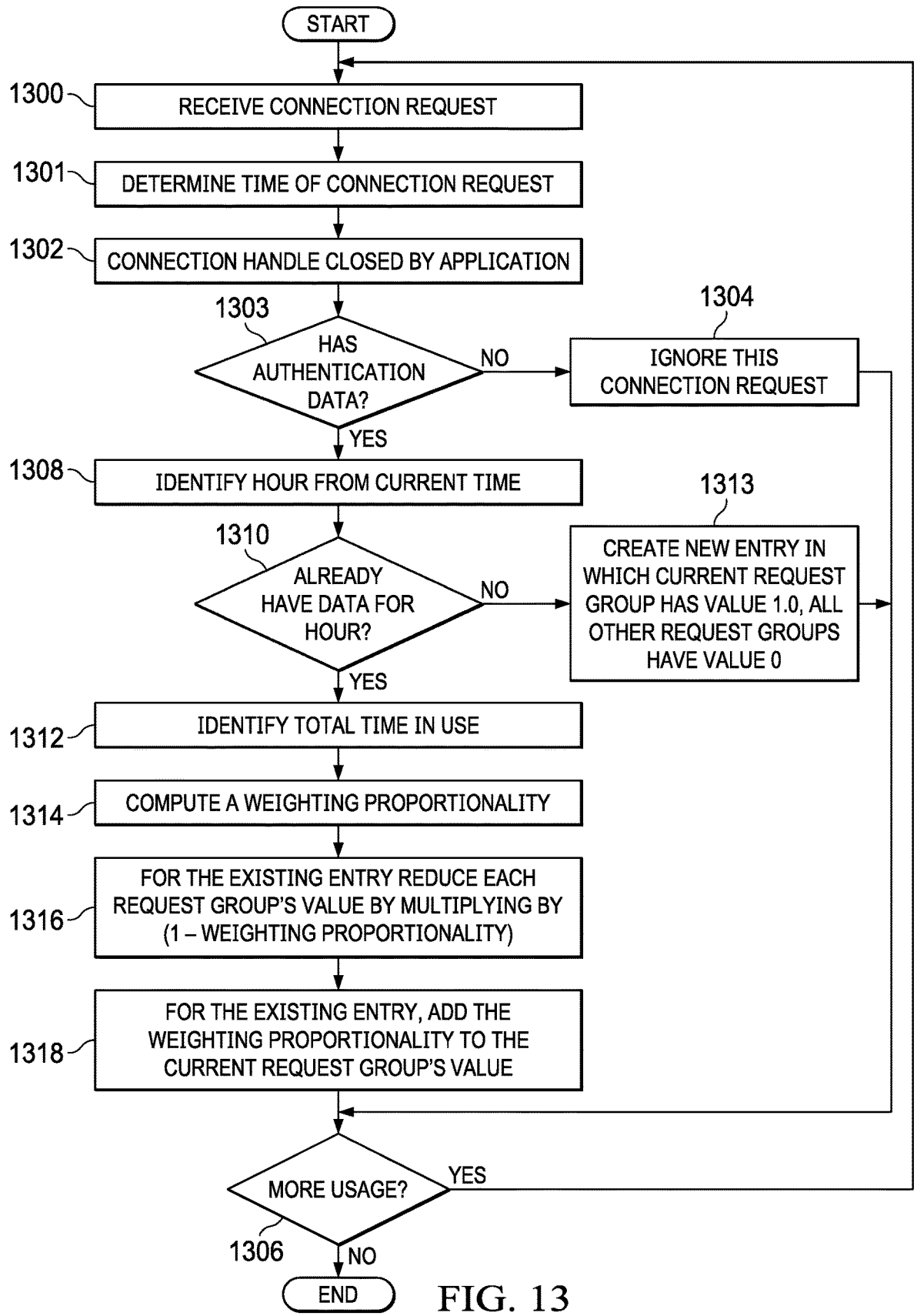
FIG. 13 is a flowchart of a process for monitoring connection data over time in accordance with an illustrative embodiment.

Turning next to FIG. 13, a flowchart of a process for monitoring connection data over time is depicted in accordance with an illustrative embodiment. This flowchart is an example of an implementation for step 600 in FIG. 6. In this example, 3 request groups, authA, authB, and authC, are present for which monitoring is performed for authentication data over time.

The process begins by receiving a connection request (step 1300). The process determines the time of the connection request (step 1301). The process received a closing of the connection handle by the application (step 1302). In step 1302, the closing of the connection handle indicates that the application no longer needs the connection and can be reused in the connection pool. The time at which the request is received and is closed can be used to determine how long the connection was used by an application.

The process determines whether authentication data is present in the connection request (step 1303). If authentication data is not present in the connection request is the connection request is ignored (step 1304). In step 1304, the process does not store any data for the connection.

The process determines whether additional usage of the connections is present (step 1306). If additional use is not present, the process terminates. Otherwise, the process returns to step 1300 as described above.

With reference again to step 1303, if authentication data is present, the process identifies the hour from the current time (step 1308). In this example, time segments are one-hour intervals and the hour for the current time is Friday 9:00 am-10:00 am. In other words, the current time is used to identify the time segment for the current hour in which the connection request is received.

The process determines whether data is present for the hour identified (step 1310). If data is not present, the process creates a new entry for the hour in which the current request group has a value of 1.0 and all other request groups have a value of 0 (step 1313). In step 1313, the connection request is from request group A as identified from authentication data identifier in the authentication data in the connection request. In this example, the entry is for the hour Friday 9:00 am-10:00 am and the data has proportions of use as authA=1.0, authB=0, and authC=0. The process then proceeds to step 1306.

If data is present for the hour identified in step 1310, the process identifies the total time in use (step 1312). In this example, the data is for the Friday 9:00 am-10:00 am and the data has proportions of use as authA=0.30, authB=0.60, and authC=0.10. In step 1312, the total time is the amount of time that has passed from when the connection is requested up until the connection handle is closed. In this example, the total time in use is 8 seconds.

The process determines a weighting proportionality based on the total time in use (step 1314). In step 1314, the weighting proportionality can be based on 0.0125 per second of use. The number of seconds of use can be determined from the time of connection identified in step 1301 and the time when the connection handle is closed in step 1302. For example, if the connection time is 8 seconds, the weighting proportionality can be determined as 0.0125×8 seconds=0.1. The process reduces each request group's value by multiplying by (1-weighting proportionality) (step 1316). The resulting values are authA=0.27, authB=0.54, and authC=0.09. The process then adds the weighting proportionality to the current request group's value (step 1318). The process then proceeds to step 1306. In step 1318, the weighting proportionality value of 0.1 is added to the current request group for which the connection request was received in step 1300 to increase the weighting. The resulting values for the request groups are as follows: authA=0.37, authB=0.54, and authC=0.09. Steps 1314-1318 provide a decaying average.

Figure 14:
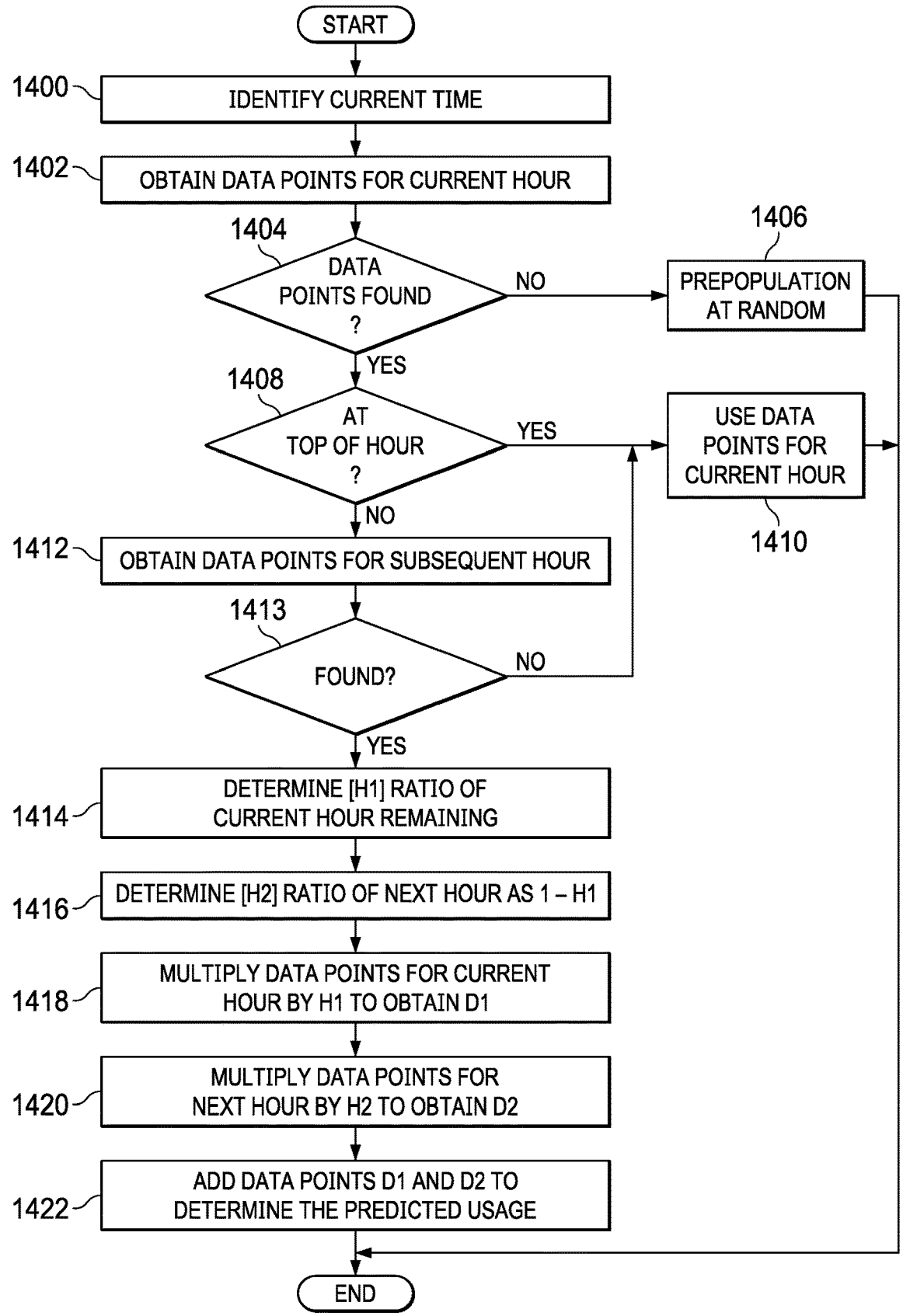
FIG. 14 is a flowchart of a process for predicting a usage trend crossing over time slots in accordance with an illustrative embodiment.

In FIG. 14, a flowchart of a process for predicting a usage trend crossing over time slots is depicted in accordance with an illustrative embodiment. The steps in FIG. 14 are an example of one implementation for step 606 in FIG. 6.

With reference to FIG. 14, a flowchart of process for process for predicting a usage trend crossing over time slots is depicted in accordance with an illustrative embodiment. The steps in this flowchart are example of an implementation for step 606 in FIG. 6. In this example, 3 request groups, authA, authB, and authC, are present for which a usage trend is predicted in which the usage trend crosses over time slots. In this example, a usage trend is predicted for a period of time that can cross over time slots.

The process begins by identifying the current time (step 1400). In this example, the current time is Friday 9:40 am. The process searches the usage data for data points for the current hour in which the current time is located (step 1402). In this example, the current hour is a time slot such as Friday 9:00 am-10:00 am. These data points are the ratios of use for the current time slot for different request groups.

A determination is made as to whether the data points are found for current hour (step 1404). In this example if data points are not found, the process populates the ratios randomly (step 1406). The process terminates thereafter.

In step 1404, if data points are found, a determination is made as to whether the time at the top of the hour (step 1408). If the current time is at the top of the hour, the data points for the current hour are used (step 1410). The process terminates thereafter. In this example, the data points for the current hour, Friday 9:00 am-10:00 am, are authA=0.37, authB=0.54, and authC=0.09.

With reference again to step 1408, if the current time is not at the top of the hour, the process searches for data points for the subsequent hour (step 1412). In this depicted example, the subsequent hour is Friday 10:00 am-11:00 am.

A determination is made as to whether the data points are found for the aforementioned subsequent hour (step 1413). In this example if data points are not found, the process the process proceeds to step 1410. Otherwise, the process determines [H1] ratio of the current hour remaining (step 1414). In this example, the data points for the aforementioned subsequent hour, Friday 10:00 am— 11:00 am, are authA=0.43, authB=0.45, and authC=0.12. The [H1] ratio is (60-40)/60=0.33. The process determines the [H2] ratio of the next hour as 1-H1 (step 1416). In this example, H2 is 1-0.33=0.67.

The process multiplies the data points for the current hour by H1 to obtain D1 (step 1418). In this example, D1 is authA=0.12, authB=0.18, and authC=0.03

The process multiplies the data points for the next hour by H2 to obtain D2 (step 1420). In this example D2 is authA=0.29, authB=0.30, and authC=0.08. The process then adds the data points D1 and D2 to determine the predicted usage (step 1422). The process terminates thereafter. In this example, the predicted usage trend for the period of time, Friday 9:40 am— 10:40 am, is authA=0.41, authB=0.48, and authC=0.11. As are result, a prediction of connection usage can be made for a period of time that crosses time slots.

Figure 15:
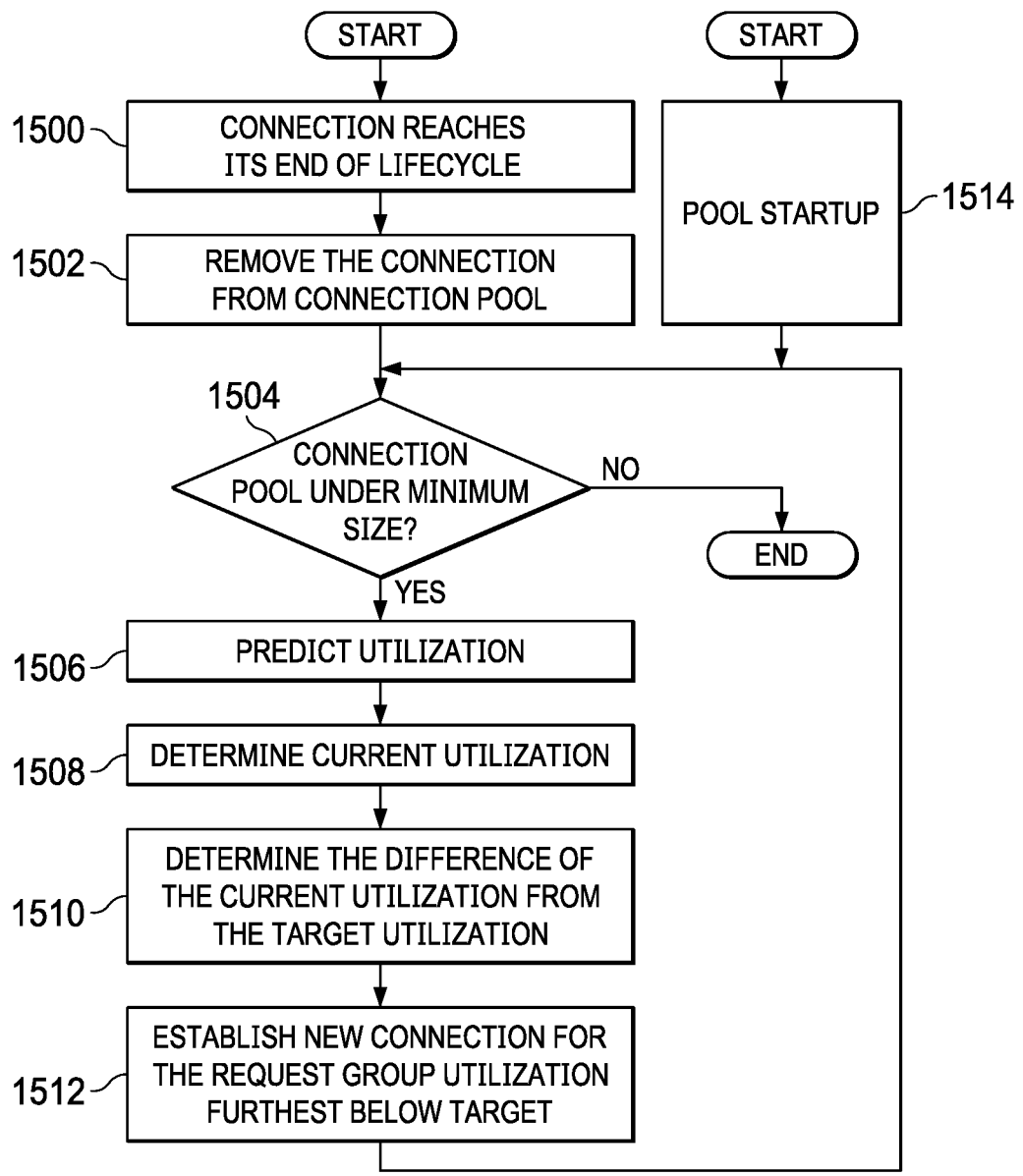
FIG. 15 is a flowchart of process for managing connections using a predicted usage trend for connections in accordance with an illustrative embodiment.

With reference to FIG. 15, a flowchart of process for managing connections using a predicted usage trend for connections is depicted in accordance with an illustrative embodiment. The steps in this flowchart are example of an implementation for step 608 in FIG. 6. In this example, 3 request groups, authA, authB, and authC, are present.

The process begins by detecting a connection reach its end of life cycle (step 1500). In step 1500, the end of life cycle can be when the connection times out or the connection becomes stale. The process removes the connection from the connection pool (step 1502). The process determines whether the connection pool is under the minimum size (step 1504). If the connection pool is not under the minimum size, the process terminates. In this case, connections do not need to be added to the connection pool to reach the minimum size for the connection pool.

Otherwise, the process predicts utilization for connections (step 1506). In this illustrative example, step 1506 can be implemented using the process described in FIG. 14. In this example, the period of time is Friday 9:40 am-10:40 am and the predicted usage trend for that period of time is authA=0.41, authB=0.48, and authC=0.11.

The process determines the current utilization of the connections (step 1508). In this example, the current utilization of the connections is authA=0.33, authB=0.56, and authC=0.11. The process determines the difference of the current utilization from the target utilization (step 1510). In this illustrative example, the target utilization is the predicted utilization determined in step 1506. This depicted example, the difference is authA=−0.08, authB=0.08, and authC=0.00.

The process establishes a new connection for the request group (authA in this example) that is furthest below the target utilization (step 1512). The process terminates thereafter. The distribution of connections in the pool in this example after establishing the new connection is authA=0.40, authB=0.50, and authC=0.10.

This illustrative example, the process can begin a pool startup (step 1514) in which the process determines whether the connection pool is under a minimum size (step 1514). As a result, the process can also be used when the connection pool is started.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, connection pool 406 can be considered part of connection pool system 402 in other illustrative examples. In yet another illustrative example, computer system 412 can also contain at least one of connection pool 406 or backend resources 410. As another example, connection manager 414 can operate to manage one or more connection pools in addition to or in place of connection pool 406. In yet another illustrative example, connection for manager 414 can use an artificial intelligence system or machine learning model to predict predicted usage trend 438 from usage data 430.

Figure 16:
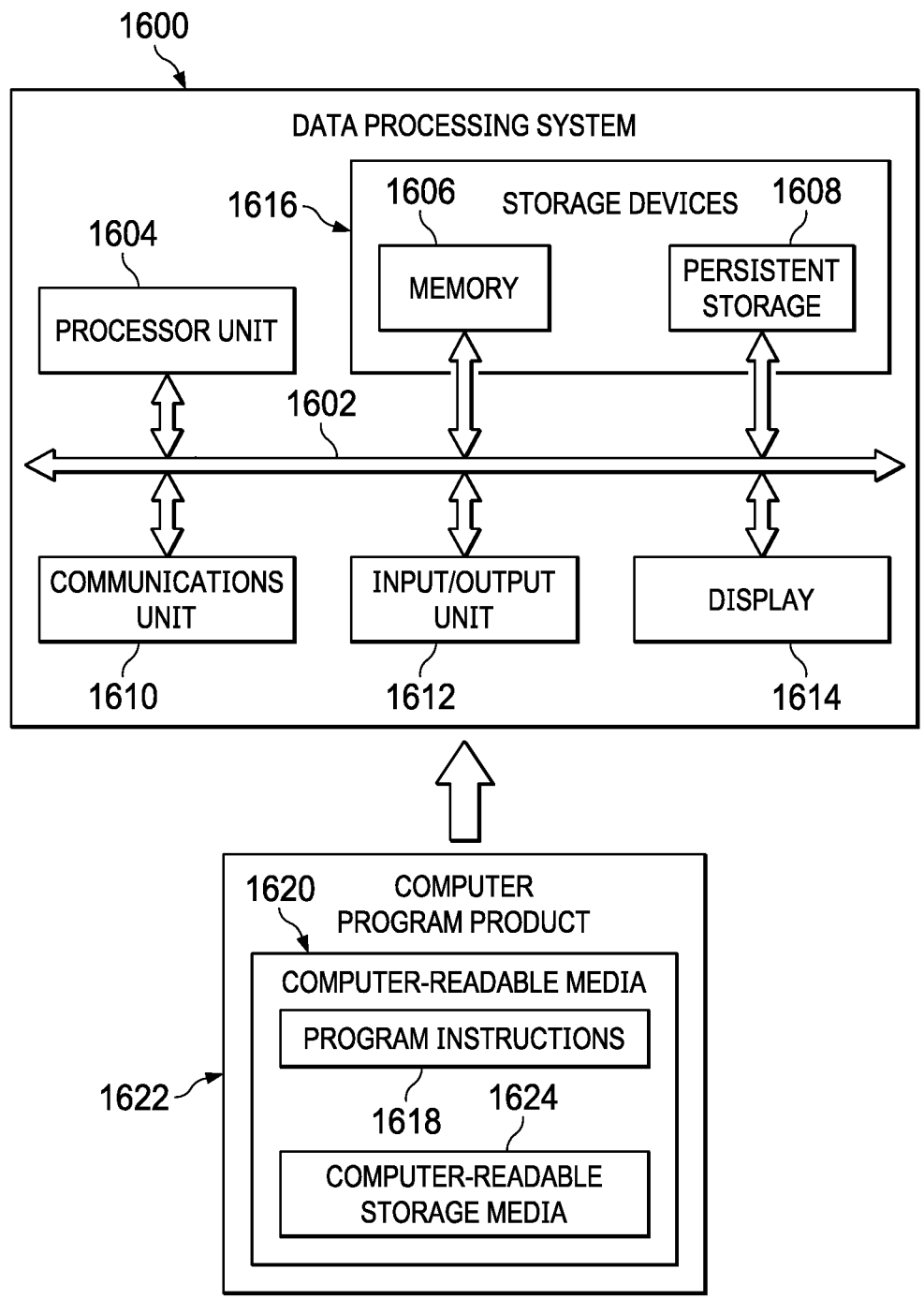
FIG. 16 is a block diagram of a data processing system in accordance with an illustrative embodiment.

Turning now to FIG. 16, a block diagram of a data processing system is depicted in accordance with an illustrative embodiment. Data processing system 1600 can be used to implement server computer 304, server computer 306, client devices 310, in FIG. 3. Data processing system 1600 can be used to implement cloud computing nodes 110 in FIG. 1, personal digital assistant (PDA) or smart phone 120A, desktop computer 120B, laptop computer 120C, and/or automobile computer system 120N in FIG. 1. Data processing system 1600 can be used to implement computers in hardware and software layer 202 in FIG. 2 as well as server computer 304, server computer 306, and client devices 310 in FIG. 3. Data processing system 2100 can also be used to implement computer system 412 in FIG. 4. In this illustrative example, data processing system 1600 includes communications framework 1602, which provides communications between processor unit 1604, memory 1606, persistent storage 1608, communications unit 1610, input/output (I/O) unit 1612, and display 1614. In this example, communications framework 1602 takes the form of a bus system.

Processor unit 1604 serves to execute instructions for software that can be loaded into memory 1606. Processor unit 1604 includes one or more processors. For example, processor unit 1604 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1604 can may be implemented using one or more heterogeneous processor systems in which a main processor is present with secondary processors on a single chip. As another illustrative example, processor unit 1604 can be a symmetric multi-processor system containing multiple processors of the same type on a single chip.

Memory 1606 and persistent storage 1608 are examples of storage devices 1616. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1616 may also be referred to as computer-readable storage devices in these illustrative examples. Memory 1606, in these examples, can be, for example, a random-access memory or any other suitable volatile or non-volatile storage device. Persistent storage 1608 may take various forms, depending on the particular implementation.

For example, persistent storage 1608 may contain one or more components or devices. For example, persistent storage 1608 can be a hard drive, a solid-state drive (SSD), a flash memory, a rewritable optical disk, a rewritable magnetic tape, or some combination of the above. The media used by persistent storage 1608 also can be removable. For example, a removable hard drive can be used for persistent storage 1608.

Communications unit 1610, in these illustrative examples, provides for communications with other data processing systems or devices. In these illustrative examples, communications unit 1610 is a network interface card.

Input/output unit 1612 allows for input and output of data with other devices that can be connected to data processing system 1600. For example, input/output unit 1612 may provide a connection for user input through at least one of a keyboard, a mouse, or some other suitable input device. Further, input/output unit 1612 may send output to a printer. Display 1614 provides a mechanism to display information to a user.

Instructions for at least one of the operating system, applications, or programs can be located in storage devices 1616, which are in communication with processor unit 1604 through communications framework 1602. The processes of the different embodiments can be performed by processor unit 1604 using computer-implemented instructions, which may be located in a memory, such as memory 1606.

These instructions are referred to as program instructions, computer usable program instructions, or computer-readable program instructions that can be read and executed by a processor in processor unit 1604. The program instructions in the different embodiments can be embodied on different physical or computer-readable storage media, such as memory 1606 or persistent storage 1608.

Program instructions 1618 is located in a functional form on computer-readable media 1620 that is selectively removable and can be loaded onto or transferred to data processing system 1600 for execution by processor unit 1604. Program instructions 1618 and computer-readable media 1620 form computer program product 1622 in these illustrative examples. In the illustrative example, computer-readable media 1620 is computer-readable storage media 1624.

Computer-readable storage media 1624 is a physical or tangible storage device used to store program instructions 1618 rather than a medium that propagates or transmits program instructions 1618. Computer readable storage media 1624, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1618 can be transferred to data processing system 1600 using a computer-readable signal media. The computer-readable signal media are signals and can be, for example, a propagated data signal containing program instructions 1618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1620" can be singular or plural. For example, program instructions 1618 can be located in computer-readable media 1620 in the form of a single storage device or system. In another example, program instructions 1618 can be located in computer-readable media 1620 that is distributed in multiple data processing systems. In other words, some instructions in program instructions 1618 can be located in one data processing system while other instructions in program instructions 1618 can be located in one data processing system. For example, a portion of program instructions 1618 can be located in computer-readable media 1620 in a server computer while another portion of program instructions 1618 can be located in computer-readable media 1620 located in a set of client computers.

The different components illustrated for data processing system 1600 are not meant to provide architectural limitations to the manner in which different embodiments can be implemented. In some illustrative examples, one or more of the components may be incorporated in or otherwise form a portion of, another component. For example, memory 1606, or portions thereof, may be incorporated in processor unit 1604 in some illustrative examples. The different illustrative embodiments can be implemented in a data processing system including components in addition to or in place of those illustrated for data processing system 1600. Other components shown in FIG. 16 can be varied from the illustrative examples shown. The different embodiments can be implemented using any hardware device or system capable of running program instructions 1618.

Thus, illustrative embodiments of the present invention provide a computer implemented method, computer system, and computer program product for managing connections in a connection pool. A number of processor units monitor connection requests to access a set of backend resources. The number of processor units identify request groups for the connection requests based on authentication data in the connection requests. The number of processor units analyze the connection requests to identify a usage trend for connections by the request groups. The number of processor units predict the usage trend of the connections for a set of time slots to form a predicted usage trend for connections for a period of time. The number of processor units manage a connection pool based on the predicted usage trend for the connections over a period of time.

As a result, increased performance in managing connection pools can be achieved. In the illustrative example, predicting usage of connections and creating allocations of connections in a connection pool according to the predictions can automatically predict authentication needs in the connection pool. As a result, the allocation of connections can more closely track requests for connections.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing connections, the computer implemented method comprising:
    monitoring, by a number of processor units, connection requests to access a set of backend resources;
    storing, by the number of processor units, authentication identifiers paired with utilization ratios for the request groups in time slots based on when the connection requests were received;
    classifying, by the number of processor units, authentication data in the connection requests to generate request groups for the connection requests;
    analyzing, by the number of processor units, the connection requests to identify a usage trend for connections by the request groups;
    predicting, for each request group in the request groups, by the number of processor units, the usage trend of the connections for a period of time to form a predicted usage trend for connections in the period of time; and
    creating, for at least one request group in the request groups, by the number of processor units, a connection in a connection pool based on the respective predicted usage trend for connections to access the set of backend resources.

2. The computer implemented method of claim 1, wherein classifying, by the number of processor units, authentication data in the connection requests to generate request groups for the connection requests comprises:
    classifying, by the number of processor units, the connection requests into the request groups based on authentication identifiers in connection data.

3. The computer implemented method of claim 1, wherein analyzing, by the number of processor units, the connection requests to identify the usage trend for connections by the request groups comprises:
    determining, by the number of processor units, decaying averages for a usage of the connections by the request groups in time slots; and
    identifying, by the number of processor units, the usage trend for connections by the request groups using the decaying averages for the usage of the connections by the request groups in the time slots.

4. The computer implemented method of claim 1, further comprising:
    determining, by the number of processor units, an allocation of the connections to the request groups for the period of time using the predicted usage trend for the connections; and
    allocating, by the number of processor units, available connections to the request groups based on the allocation of the connections to the request groups for the period of time.

5. The computer implemented method of claim 4, further comprising:
    creating, by the number of processor units, a new connection in the connection pool in response to a number of the connections in the connection pool falling below a minimum number of connections for the connection pool; and
    assigning, by the number of processor units, the new connection to a request group in the request groups that is furthest below a target allocation in the allocation of the connections in the connection pool to the request groups for the period of time.

6. The computer implemented method of claim 1, wherein managing, by the number of processor units, the connection pool based on the predicted usage trend for connections comprises:
    managing, by the number of processor units, the connection pool based on the predicted usage trend for connections in response to at least one of a startup, performing a maintenance on the connections, or removing a stale connection.

7. A computer system comprising:
    comprising a number of processor units, wherein the number of processor units executes program instructions to:
    monitor connection requests to access a set of backend resources;
    store authentication identifiers paired with utilization ratios for the request groups in time slots based on when the connection requests were received;
    classify authentication data in the connection requests to generate request groups for the connection requests;
    analyze the connection requests to identify a usage trend for connections by the request groups;
    predict, for each request group in the request groups, the usage trend of the connections for a period of time to form a predicted usage trend for connections in the period of time; and
    create, for at least one request group in the request groups, a connection in a connection pool based on the respective predicted usage trend for connections in the period of time to access the set of backend resources.

8. The computer system of claim 7, wherein classifying authentication data in the connection requests to generate request groups for the connection request, the number of processor units executes program instructions to:
    classify the connection requests into the request groups based on authentication identifiers in connection data.

9. The computer system of claim 7, wherein in analyzing the connection requests to identify the usage trend for connections by the request groups, the number of processor units executes program instructions to:
    determine decaying averages for a usage of the connections by the request groups in time slots; and
    identify the usage trend for connections by the request groups using the decaying averages for the usage of the connections by the request groups in the time slots.

10. The computer system of claim 7, the number of processor units further executes program instructions to:
    determine an allocation of the connections to the request groups for the period of time using the predicted usage trend for the connections; and
    allocate available connections to the request groups based on the allocation of the connections to the request groups for the period of time.

11. The computer system of claim 10, the number of processor units further executes program instructions to:
    create a new connection in the connection pool in response to a number of connections in the connection pool falling below a minimum number of connections for the connection pool; and
    assign the new connection to a request group in the request groups that is furthest below a target allocation in the allocation of the connections in the connection pool to the request groups for the period of time.

12. The computer system of claim 7, wherein in managing the connection pool based on the predicted usage trend for connections, the number of processor units executes program instructions to:
- manage, by the number of processor units, the connection pool based on the predicted usage trend for connections in response to at least one of a startup, performing a maintenance on the connections, or removing a stale connection.

13. A computer program product for managing connections, the computer program product comprising a computer readable storage medium having program instructions embodied therewith, the program instructions executable by a computer system to cause the computer system to perform a method of:
- monitoring, by a number of processor units, connection requests to access a set of backend resources;
- storing, by the number of processor units, authentication identifiers paired with utilization ratios for the request groups in time slots based on when the connection requests were received;
- classifying, by the number of processor units, authentication data in the connection requests to generate request groups for the connection requests;
- analyzing, by the number of processor units, the connection requests to identify a usage trend for connections by the request groups;
- predicting, for each request group in the request groups, by the number of processor units, the usage trend of the connections for a period of time to form a predicted usage trend for connections in the period of time; and
- creating, for at least one request group in the request groups, by the number of processor units, a connection in a connection pool based on the respective predicted usage trend for connections to access the set of backend resources.

14. The computer program product of claim 13, wherein classifying, by the number of processor units, authentication data in the connection requests to generate request groups for the connection requests:
- classifying, by the number of processor units, the connection requests into the request groups based on authentication identifiers in connection data.

15. The computer program product of claim 13, wherein analyzing, by the number of processor units, the connection requests to identify the usage trend for connections by the request groups comprises:
- determining, by the number of processor units, decaying averages for a usage of the connections by the request groups in time slots; and
- identifying, by the number of processor units, the usage trend for connections by the request groups using the decaying averages for the usage of the connections by the request groups in the time slots.

16. The computer program product of claim 13, further comprising:
- determining, by the number of processor units, an allocation of the connections to the request groups for period the of time using the predicted usage trend for the connections; and
- allocating, by the number of processor units, available connections to the request groups based on the allocation of the connections to the request groups for the period of time.

17. The computer program product of claim 16, further comprising:
- creating, by the number of processor units, a new connection in the connection pool in response to a number of the connections in the connection pool falling below a minimum number of the connections for the connection pool; and
- assigning, by the number of processor units, the new connection to a request group in the request groups that is furthest below a target allocation in the allocation of the connections in the connection pool to the request groups for the period of time.

* * * * *